United States Patent
Froehlich et al.

(10) Patent No.: US 10,419,762 B2
(45) Date of Patent: Sep. 17, 2019

(54) CONTENT-ADAPTIVE PERCEPTUAL QUANTIZER FOR HIGH DYNAMIC RANGE IMAGES

(71) Applicants: Dolby Laboratories Licensing Corporation, San Francisco, CA (US); DOLBY INTERNATIONAL AB, Amsterdam Zuidoost (NL)

(72) Inventors: Jan Froehlich, Munich (DE); Guan-Ming Su, Fremont, CA (US); Robin Atkins, San Jose, CA (US); Scott Daly, Kalama, WA (US); Jon Scott Miller, Harleysville, PA (US)

(73) Assignees: Dolby Laboratories Licensing Corporation, San Francisco, CA (US); Dolby International AB, Amterdam Zuidoost (NL)

( * ) Notice: Subject to any disclaimer, the term of this patent is extended or adjusted under 35 U.S.C. 154(b) by 44 days.

(21) Appl. No.: 15/555,047

(22) PCT Filed: Mar. 1, 2016

(86) PCT No.: PCT/US2016/020230
§ 371 (c)(1),
(2) Date: Aug. 31, 2017

(87) PCT Pub. No.: WO2016/140954
PCT Pub. Date: Sep. 9, 2016

(65) Prior Publication Data
US 2018/0041759 A1    Feb. 8, 2018

Related U.S. Application Data

(60) Provisional application No. 62/126,925, filed on Mar. 2, 2015.

(51) Int. Cl.
*H04N 19/124*    (2014.01)
*H04N 19/136*    (2014.01)
(Continued)

(52) U.S. Cl.
CPC ......... *H04N 19/124* (2014.11); *H04N 19/117* (2014.11); *H04N 19/132* (2014.11);
(Continued)

(58) Field of Classification Search
CPC ...... G09G 5/10; G09G 3/3426; H04N 19/124; H04N 19/117; H04N 19/182;
(Continued)

(56) References Cited

U.S. PATENT DOCUMENTS 4,364,081 A * 12/1982 Hashimoto ........ G11B 20/1813
                                                            348/466
5,084,904 A    1/1992 Daito
(Continued)

FOREIGN PATENT DOCUMENTS

JP    2007-221821    8/2007
JP    2009-224854    10/2009
(Continued)

OTHER PUBLICATIONS

Lui, Ka-Chun et al "An Adaptive Palette Reordering Method for Compressing Color-Indexed Image" IEEE Region 10 Conference, Nov. 14-17, 2006, pp. 1-4.
(Continued)

*Primary Examiner* — Tracy Y. Li (57) ABSTRACT

A content-adaptive quantizer processor receives an input image with an input bit depth. A noise-mask generation process is applied to the input image to generate a noise mask image which characterizes each pixel in the input image in terms of its perceptual relevance in masking quantization noise. A noise mask histogram is generated
(Continued)

based on the input image and the noise mask image. A masking-noise level to bit-depth function is applied to the noise mask histogram to generate minimal bit depth values for each bin in the noise mask histogram. A codeword mapping function is generated based on the input bit depth, a target bit depth, and the minimal bit depth values. The codeword mapping function is applied to the input image to generate an output image in the target bit depth.

21 Claims, 6 Drawing Sheets

(51) Int. Cl.
H04N 19/98 (2014.01)
H04N 19/117 (2014.01)
H04N 19/132 (2014.01)
H04N 19/156 (2014.01)
H04N 19/182 (2014.01)
H04N 19/154 (2014.01)

(52) U.S. Cl.
CPC ......... H04N 19/136 (2014.11); H04N 19/156 (2014.11); H04N 19/182 (2014.11); H04N 19/98 (2014.11); *H04N 19/154* (2014.11)

(58) Field of Classification Search
CPC .... H04N 19/156; H04N 19/132; H04N 19/98; H04N 19/136; H04N 19/154; G11L 19/035
See application file for complete search history.

(56) References Cited

U.S. PATENT DOCUMENTS

| | | | |
|---|---|---|---|
| 5,933,194 | A | 8/1999 | Kim |
| 6,058,211 | A | 5/2000 | Bormans |
| 7,680,346 | B2 | 3/2010 | Han |
| 7,697,754 | B2 | 4/2010 | Park |
| 8,064,517 | B1 | 11/2011 | Viscito |
| 8,189,933 | B2 | 5/2012 | Holcomb |
| 8,503,536 | B2 | 8/2013 | Zuo |
| 8,655,092 | B2 | 2/2014 | Li |
| 8,711,926 | B2 | 4/2014 | Malayath |
| 8,761,247 | B2 | 6/2014 | Bock |
| 8,761,268 | B2 | 6/2014 | Xu |
| 9,497,456 | B2 | 11/2016 | Su |
| 9,584,811 | B2 | 2/2017 | Su |
| 9,628,808 | B2 | 4/2017 | Su |
| 2010/0135575 | A1* | 6/2010 | Guo ....................... H04N 9/646 382/164 |
| 2011/0169881 | A1* | 7/2011 | Wallener ............. G09G 3/3426 345/690 |
| 2012/0007753 | A1* | 1/2012 | Maeda ................. G10L 19/035 341/67 |
| 2013/0287099 | A1 | 10/2013 | Kwon |
| 2013/0321673 | A1 | 12/2013 | Lim |
| 2014/0301649 | A1 | 10/2014 | Zhang |
| 2017/0251211 | A1 | 8/2017 | Froehlich |

FOREIGN PATENT DOCUMENTS

| | | |
|---|---|---|
| JP | 2013-214992 | 10/2013 |
| JP | 2014-510339 | 4/2014 |
| KR | 203695 | 6/1999 |
| KR | 316764 | 11/2001 |
| KR | 10-0344807 | 7/2002 |
| KR | 2011-0087246 | 8/2011 |
| KR | 2013-0078569 | 7/2013 |
| KR | 10-1309498 | 9/2013 |
| RU | 2533855 | 11/2014 |
| WO | 2013/086169 | 6/2013 |
| WO | 2013/144809 | 10/2013 |
| WO | 2014/025588 | 2/2014 |
| WO | 2014/107255 | 7/2014 |
| WO | 2014/160705 | 10/2014 |
| WO | 2014/204865 | 12/2014 |

OTHER PUBLICATIONS

Nezamabadi, M. et al "Color Signal Encoding for High Dynamic Range and Wide Color Gamut Based on Human Perception" SPIE Digital Library vol. 9015, 2014, pp. 1-13.
Mantiuk, Rafat, et al. "HDR-VDP-2: A calibrated visual metric for visibility and quality predictions in all luminance conditions." ACM Transactions on Graphics (TOG). vol. 30. No. 4. ACM, 2011.
Zhang, Y. et al "High Dynamic Range Video Compression by Intensity Dependent Spatial Quantization in HEVC" Picture Coding Symposium, IEEE, Dec. 8, 2013, pp. 353-356.
Daly, S. et al "Decontouring: Prevention and Removal of False Contour Artifacts" Proceedings of SPIE, vol. 5292, Jun. 7, 2004, pp. 130-149.
Miller, S. et al "Perceptual Signal Coding for More Efficient Usage of Bit Codes" SMPTE Motion Imaging Journal, vol. 122, No. 4, May 1, 2013, pp. 52-59.
SMPTE 2084:2014 "High Dynamic Range Electro-Optical Transfer Function of Mastering Reference Displays" Aug. 16, 2014.
ITU-R Recommendation ITU-R BT.1886 "Reference Electro-Optical Transfer Function for Flat Panel Displays Used in HDTV Studio Production"Mar. 2011, pp. 1-7.
Stessen J. et al "Chromatically Based Color Signals for Wide Color Gamut and High Dynamic Range" ISO/IEC JTC1/SC29/WG11 MPEG2014/M35065, Oct. 2014, pp. 1-18.

* cited by examiner

CONTENT-ADAPTIVE PERCEPTUAL QUANTIZER FOR HIGH DYNAMIC RANGE IMAGES

CROSS-REFERENCE TO RELATED APPLICATIONS

This application claims the benefit of priority to U.S. Provisional Application No. 62/126,925, filed on 2 Mar. 2015, hereby incorporated by reference in its entirety.

TECHNOLOGY

The present invention relates generally to images. More particularly, an embodiment of the present invention relates to content-adaptive perceptual quantization of images with high dynamic range.

BACKGROUND

As used herein, the term 'dynamic range' (DR) may relate to a capability of the human visual system (HVS) to perceive a range of intensity (e.g., luminance, luma) in an image, e.g., from darkest darks (blacks) to brightest whites (highlights). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 orders of magnitude of the human visual system (HVS). In practice, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is perceivable within a scene or image by a human visual system (HVS) that includes eye movements, allowing for some light adaptation changes across the scene or image. As used herein, EDR may relate to a DR that spans 5 to 6 orders of magnitude. Thus while perhaps somewhat narrower in relation to true scene referred HDR, EDR nonetheless represents a wide DR breadth and may also be referred to as HDR.

In practice, images comprise one or more color components (e.g., luma Y and chroma Cb and Cr) wherein each color component is represented by a precision of n-bits per pixel (e.g., n=8). Using linear luminance coding, images where n≤8 (e.g., color 24-bit JPEG images) are considered images of standard dynamic range, while images where n>8 may be considered images of enhanced dynamic range. EDR and HDR images may also be stored and distributed using high-precision (e.g., 16-bit) floating-point formats, such as the OpenEXR file format developed by Industrial Light and Magic.

A reference electro-optical transfer function (EOTF) for a given display characterizes the relationship between color values (e.g., luminance) of an input video signal to output screen color values (e.g., screen luminance) produced by the display. For example, ITU Rec. ITU-R BT. 1886, "Reference electro-optical transfer function for flat panel displays used in HDTV studio production," (March 2011), which is included herein by reference in its entity, defines the reference EOTF for flat panel displays based on measured characteristics of the Cathode Ray Tube (CRT). Given a video stream, information about its EOTF is typically embedded in the bit stream as metadata. As used herein, the term "metadata" relates to any auxiliary information that is transmitted as part of the coded bitstream and assists a decoder to render a decoded image. Such metadata may include, but are not limited to, color space or gamut information, reference display parameters, and auxiliary signal parameters, as those described herein.

Most consumer desktop displays currently support luminance of 200 to 300 $cd/m^2$ or nits. Most consumer HDTVs range from 300 to 500 nits with new models reaching 1000 nits ($cd/m^2$). Such conventional displays thus typify a lower dynamic range (LDR), also referred to as a standard dynamic range (SDR), in relation to HDR or EDR. As the availability of HDR content grows due to advances in both capture equipment (e.g., cameras) and HDR displays (e.g., the PRM-4200 professional reference monitor from Dolby Laboratories), HDR content may be color graded and displayed on HDR displays that support higher dynamic ranges (e.g., from 1,000 nits to 5,000 nits or more). Such displays may be defined using alternative EOTFs that support high luminance capability (e.g., 0 to 10,000 nits). An example of such an EOTF is defined in SMPTE ST 2084:2014 "High Dynamic Range EOTF of Mastering Reference Displays," which is incorporated herein by reference in its entirety. In general, without limitation, the methods of the present disclosure relate to any dynamic range higher than SDR. As appreciated by the inventors here, improved techniques for the perceptual quantization of high-dynamic range images are desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Content-adaptive techniques for the perceptual quantization of high dynamic range (HDR) images are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to the adaptive perceptual quantization of images. A content-adaptive quantizer processor receives an input image with an input bit depth. A noise-mask generation process is applied to the input image to generate a noise mask image which characterizes each pixel in the input image in terms of its perceptual relevance in masking quantization noise. A noise mask histogram is generated based on the input image and the noise mask image. A masking-noise level to bit-depth function is applied to the noise mask histogram to generate minimal bit depth values for each bin in the noise mask histogram. A codeword mapping function is generated based on the input bit depth, a target bit depth, and the minimal bit depth values. The codeword mapping function is applied to the input image to generate an output image in the target bit depth, which is lower than the input bit depth.

Example Video Delivery Processing Pipeline

Figure 1A:
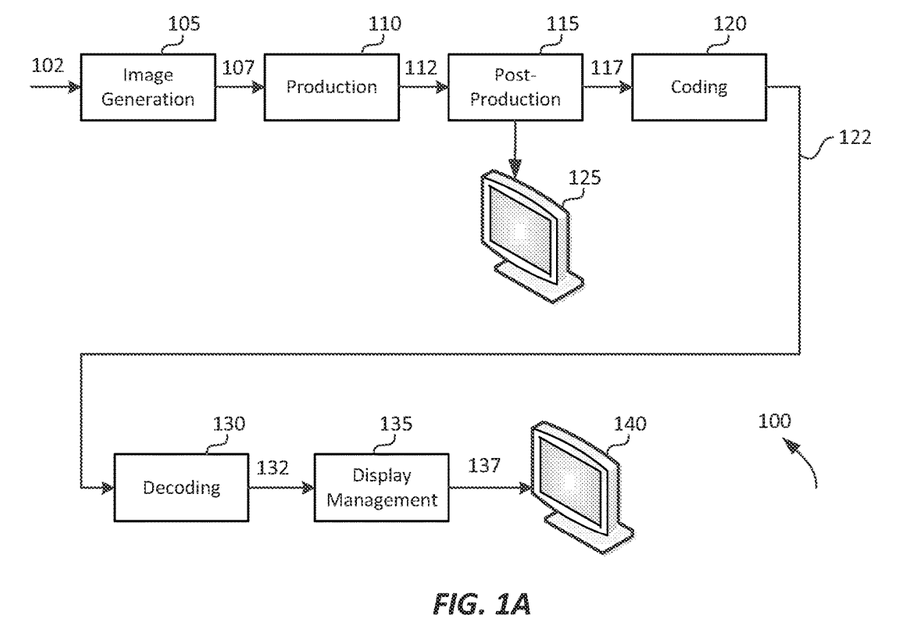
FIG. 1A depicts an example process for a video delivery pipeline.

FIG. 1A depicts an example process of a conventional video delivery pipeline (100) showing various stages from video capture to video content display. A sequence of video frames (102) is captured or generated using image generation block (105). Video frames (102) may be digitally captured (e.g. by a digital camera) or generated by a computer (e.g. using computer animation) to provide video data (107). Alternatively, video frames (102) may be captured on film by a film camera. The film is converted to a digital format to provide video data (107). In a production phase (110), video data (107) is edited to provide a video production stream (112).

The video data of production stream (112) is then provided to a processor at block (115) for post-production editing. Block (115) post-production editing may include adjusting or modifying colors or brightness in particular areas of an image to enhance the image quality or achieve a particular appearance for the image in accordance with the video creator's creative intent. This is sometimes called "color timing" or "color grading." Other editing (e.g. scene selection and sequencing, image cropping, addition of computer-generated visual special effects, etc.) may be performed at block (115) to yield a final version (117) of the production for distribution. During post-production editing (115), video images are viewed on a reference display (125).

Following post-production (115), video data of final production (117) may be delivered to encoding block (120) for delivering downstream to decoding and playback devices such as television sets, set-top boxes, movie theaters, and the like. In some embodiments, coding block (120) may include audio and video encoders, such as those defined by ATSC, DVB, DVD, Blu-Ray, and other delivery formats, to generate coded bit stream (122). In a receiver, the coded bit stream (122) is decoded by decoding unit (130) to generate a decoded signal (132) representing an identical or close approximation of signal (117). The receiver may be attached to a target display (140) which may have completely different characteristics than the reference display (125). In that case, a display management block (135) may be used to map the dynamic range of decoded signal (132) to the characteristics of the target display (140) by generating display-mapped signal (137).

Signal Quantization

Currently, most digital interfaces for video delivery, such as the Serial Digital Interface (SDI) are limited to 12 bits per pixel per component. Furthermore, most compression standards, such as H.264 (or AVC) and H.265 (or HEVC), are limited to 10-bits per pixel per component. Therefore efficient encoding and/or quantization is required to support HDR content, with dynamic range from approximately 0.001 to 10,000 $cd/m^2$ (or nits), within existing infrastructures and compression standards.

The term "PQ" as used herein refers to perceptual luminance amplitude quantization. The human visual system responds to increasing light levels in a very non-linear way. A human's ability to see a stimulus is affected by the luminance of that stimulus, the size of the stimulus, the spatial frequencies making up the stimulus, and the luminance level that the eyes have adapted to at the particular moment one is viewing the stimulus. In a preferred embodiment, a perceptual quantizer function maps linear input gray levels to output gray levels that better match the contrast sensitivity thresholds in the human visual system. An examples of PQ mapping functions (or EOTFs) is described in SMPTE ST 2084:2014 "High Dynamic Range EOTF of Mastering Reference Displays," which is incorporated herein by reference in its entirety, where given a fixed stimulus size, for every luminance level (i.e., the stimulus level), a minimum visible contrast step at that luminance level is selected according to the most sensitive adaptation level and the most sensitive spatial frequency (according to HVS models). Compared to the traditional gamma curve, which represents the response curve of a physical cathode ray tube (CRT) device and coincidentally may have a very rough similarity to the way the human visual system responds, a PQ curve imitates the true visual response of the human visual system using a relatively simple functional model.

For example, under SMPTE ST 2084, at 1 $cd/m^2$, one 12-bit code value corresponds to a relative change of approximately 0.0048 $cd/m^2$; however, at 1,000 $cd/m^2$, one 12-bit code value corresponds to a relative change of approximately 2.24 $cd/m^2$. This non-linear quantization is needed to accommodate for the non-linear contrast sensitivity of the human visual system (HVS).

Another example of a perceptually-quantized EOTF is presented in "Chromaticity based color signals for wide color gamut and high dynamic range," by J. Stessen et al., ISO/IEC JTC1/SC29/WG11 MPEG2014/M35065, October 2014, which is incorporated herein by reference in its entirety.

Contrast sensitivity of the HVS does not only depend on luminance but also on masking characteristics of the image content (most particularly noise and texture), as well as the adaptation state of the HVS. In other words, depending on the noise level or the texture characteristics of an image, image content can be quantized with larger quantization steps than those predicted by PQ or gamma quantizers, because texture and noise mask quantization artifacts. The PQ quantization describes the best the HVS can do, which occurs when there is no noise or masking in the image. However, for many images (frames of a video), there is significant masking.

In addition to noise and texture masking, other characteristics of visual behavior, such as optical flare and local adaptation may also be taken into consideration to increase the level of quantization and allow representing HDR images at 10-bits or lower per color component. As used herein, the terms "Content-Adaptive PQ" or "Adaptive PQ" for short, denote methods to adaptively adjust the perceptually quantization of images based on their content.

Figure 1B:
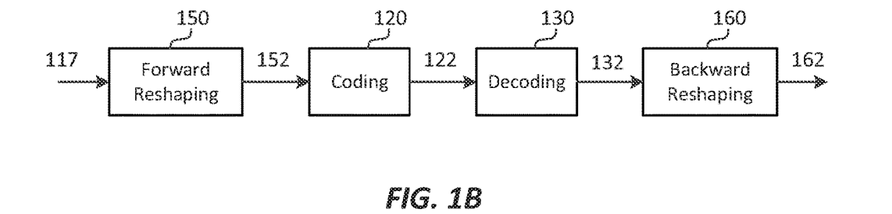
FIG. 1B depicts an example process for data compression using content-adaptive quantization or reshaping according to an embodiment of this invention.

FIG. 1B depicts an example process for Adaptive PQ according to an embodiment. Given input frames (117), a forward reshaping block (150) analyzes the input and the coding constrains and generates codeword mapping functions which map input frames (117) to re-quantized output frames (152). For example, input (117) may be gamma-coded or PQ-coded according to certain EOTF. In some embodiments, information about the reshaping process may be communicated to downstream devices (such as decoders) using metadata. Following coding (120) and decoding (130), decoded frames (132) may be processed by a backward reshaping function (160), which converts the re-quantized frames (132) back to the original EOTF domain (e.g., gamma or PQ), for further downstream processing, such as the display management process (135) discussed earlier. In some embodiments, the backward reshaping function (160) may be integrated with a de-quantizer in decoder (130), e.g., as part of the de-quantizer in an AVC or HEVC video decoder.

Adaptive PQ

Figure 2:
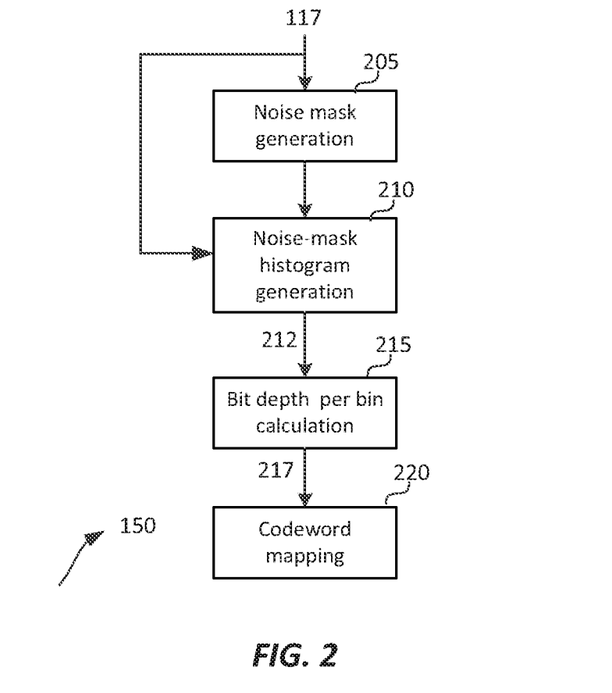
FIG. 2 depicts an example process for content-adaptive perceptual quantization according to an embodiment of this invention.

FIG. 2 depicts an example process for content-adaptive perceptual quantization according to an embodiment of this invention. As depicted in FIG. 2, given a sequence of images (e.g., video frames) (117), block (205) is used to generate a noise mask image which characterizes each pixel in the input image in terms of its perceptual relevance in masking quantization noise. The noise mask image, in combination with the original image data, is used in step (210) to generate a noise mask histogram. Block (215) estimates the number of minimum bits required for each bin of the histogram generated in step (210), and finally, codeword mapping block (220) computes the mapping function to translate the input signal (117) to its quantized output. Each of these steps is described in more detail next.

Noise Mask Generation

Figure 3:
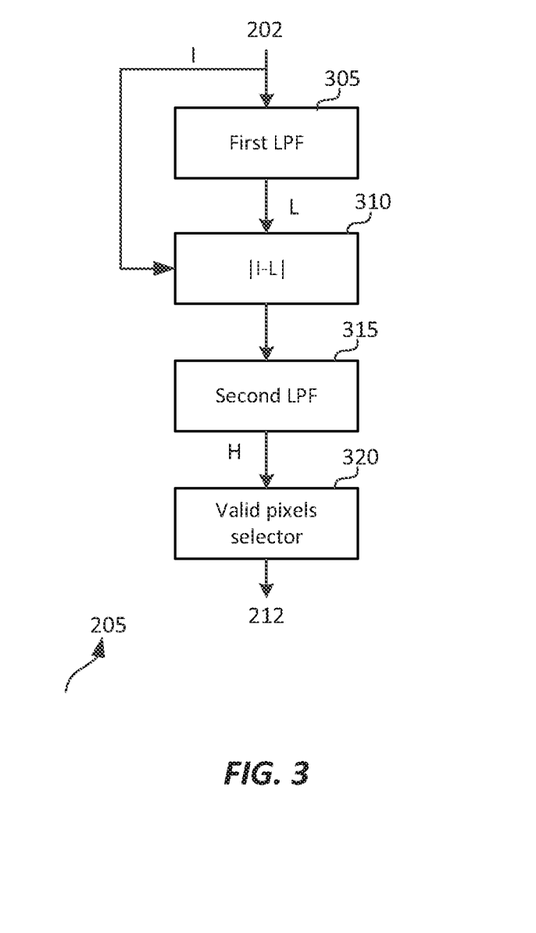
FIG. 3 depicts an example process for noise-mask generation according to an embodiment of this invention.

The basic idea of adaptive PQ is to allocate fewer bits in areas of the image that are noisy or have high texture, and more bits in areas of the image that are perceived as noise-free or smoother. Given an input image (117), the noise-mask generation block (205) generates an estimate of masking noise for each pixel in the image. In some embodiments, input (117) may be already coded using a gamma or PQ-based quantizer. In some other embodiments, input image (117) may be in linear space. FIG. 3 depicts an example process of noise mask generation according to an embodiment. Some other embodiments may generate noise masks using alternative methods known in the art for measuring local entropy in images, such as entropy filtering over a moving window, standard deviation filtering over a moving window, or range filtering over a moving window.

Let $I_{jp}$ denote the p-th pixel of a color component under quantization (e.g., luminance) in the j-th frame in the input sequence (117), normalized to [0 1). Let $v_{L_j}$ and $v_{H_j}$ denote the minimum and maximum pixel values in this frame, or $$v_{L_j} = \min\{I_{jp}\},$$
$$v_{H_j} = \max\{I_{jp}\}. \quad (1)$$

As depicted in FIG. 3, in block (305) a first low-pass filter is applied to image frame $I_j$. In an embodiment, this filter mimics the characteristics of the human visual system. Depending on the available computational power, this filter may range from a very simple filter, like a Box filter or a Gaussian filter, to more complex filter banks, like those implementing the Cortex transform. In an embodiment, the first filter may be a two-dimensional Gaussian filter $G(r_L, \sigma_L^2)$ with support range $r_L$, and variance $\sigma_L^2$ (e.g., $r_L=9$ and $\sigma_L^2=3$ or $r_L=33$ and $\sigma_L^2=4$). Then, its output (L) may be expressed as $$L_{jp} = I_{jp} \otimes G(r_L, \sigma_L^2), \quad (2)$$

where the symbol $\otimes$ denotes a convolution. Given the output of the first filter, the high frequencies components of the input frame may be extracted in block (310) as $$\tilde{H}_{jp} = |I_{jp} - L_{jp}|. \quad (3)$$

The output of block (310) may then be filtered again by a second low-pass filter (315) to generate the noise mask (H). This is to address the low-phase accuracy of HVS masking (that is, there is still masking at the zero crossings of a masking signal). In an embodiment, the second LPF may also be a Gaussian filer with support range $r_H$ and variance $\sigma_H^2$ (e.g., $r_H=9$, $\sigma_H^2=3$). Then, the noise mask (H) may be expressed as $$H_{jp} = \tilde{H}_{jp} \otimes G(r_H, \sigma_H^2). \quad (4)$$

In an embodiment, the parameters of the first and second low pass filters may be the same. In a preferred embodiment, the first and second low-pass filters are separable filters to improve computational efficiency. In an embodiment, an optional block (320) may be used to identify $H_{jp}$ pixels that can be ignored in subsequent processing since they may bias the adaptive quantization process. For example, if the image includes a letterbox frame (that is, black pixels that may frame the original image so that it conforms to a particular frame size or aspect ratio), then values related to the letterbox pixels may be ignored. Values related to image boundaries or letterbox boundaries may also be ignored since the output of the low-pass filters assumes that data at these borders are padded with constant values, which will generate lower noise values. Let $\Omega_j$ denote the set of all valid pixels under considerations, then the final output noise mask (322) may be expressed as $$H_j(i), i \in \Omega_j. \quad (5)$$

Noise Mask Histogram Generation

Let $B_1$ denote the bit-depth of the input image (117) (e.g., $B_1=16$) and let $K=2^{B_I}$, then the dynamic range 0 to K−1 may be partitioned into M bins of equal pixel interval values W, that is W=K/M. In an embodiment, for the j-th frame, a noise histogram $b_j(m)$, where m denotes the m-th histogram bin (m=0, 1, 2, . . . M−1), may be generated as follows:

a) Identify all pixels in the original image ($I_{ji}$, $i \in \Omega_j$) which have pixel values in the range $$\left[\frac{m}{M}, \frac{m+1}{M}\right).$$

b) Among those pixels, select the minimal $H_j(i)$, since, as described earlier, the masking elevation is not a 2D map. Or, given $$\Psi_{j,m} = \left\{ i \left| \frac{m}{M} \leq I_{ji} < \frac{m+1}{M} \right. \right\}, \quad (6)$$

$$b_j(m) = \min\{H_j(i) \mid i \in \Psi_{j,m}\}.$$

Note that sometimes certain bins may be empty, since there might not be any image pixels within the bin's pixel range. The indices of these bins may be stored and their state will be addressed later.

Adaptive PQ values may be adjusted at the frame level or at the scene level. As used herein, the terms 'scene' or 'shot' for a video sequence may relate to a series of consecutive frames in the video signal sharing similar color and dynamic range characteristics. Because of the consecutive nature of video prediction in most video compression formats, it may be preferable to adjust the quantization parameters only at boundaries that match the typical boundaries of a video encoder, such as scene changes or a new group of pictures (GOP). Thus, given a scene with F frames, and frame-based noise-masking histograms $b_j(m)$, a scene-based noise-masking histogram $b(m)$ may be derived as $$b_m = \min\{b_j(m) \mid j=0,1,\ldots,F-1\}. \quad (7)$$

In an embodiment, assuming a noise upper bound of 1, noise bins for which there are no pixels values for the entire scene they may be assigned the maximum possible noise level value, 1. In some embodiments, missing bins may also be interpolated from neighboring bins. For $j=1, 2, \ldots, F$, scene-based minimum and maximum pixel values may also be generated as $$v_L = \min\{v_{Lj}\},$$

$$v_H = \max\{v_{Hj}\}. \quad (8)$$

Figure 4:
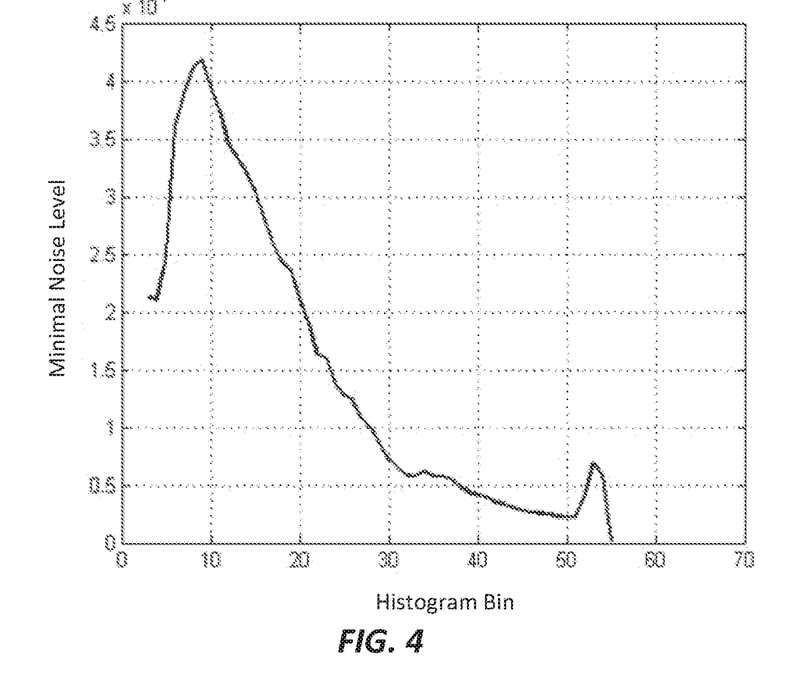
FIG. 4 depicts a scene-based noise masking histogram according to an embodiment of this invention.

FIG. 4 depicts an example of a scene-based noise masking histogram for an HDR scene for $B_I=16$ and $M=64$ bins. In this example, the dark regions incorporate higher masking noise levels than the mid-tones and the highlights.

Bit Depth per Histogram-Bin Calculation

Figure 5:
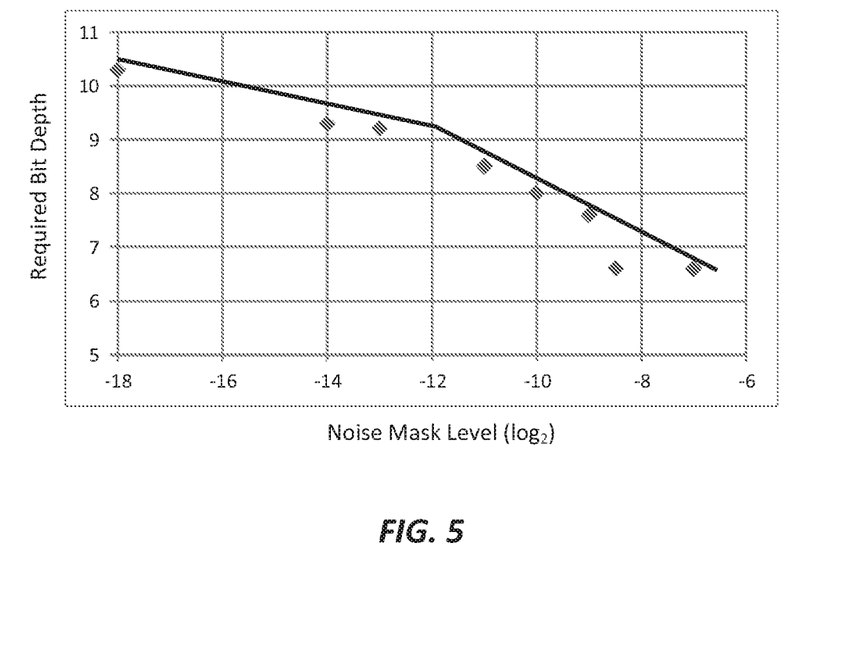
FIG. 5 depicts an example of a mapping function which maps noise-mask levels to required signal bit depth according to an embodiment of this invention.

Given the noise level $b_m$ for each bin in the noise-mask histogram, the next step would be to determine the number of bits that need to be allocated for each bin. In an embodiment, such a mapping may be determined based on experimental user study results. For example, in one such study, users were shown to evaluate test images quantized to different bit depths, where Gaussian noise was added to the images before the quantization. As an example, FIG. 5 depicts the results of a user study using Gaussian filters with $r_L=9$ and $\sigma_L^2=3$. For example, for a noise mask level of $2^{-10}$, the required bit depth is 8 bits. As expected, FIG. 5 indicates that image regions with higher levels of mask noise can achieve full visual transparency at smaller bit depths. Alternatively, the smoother the image, the more bit depth is needed for an accurate and perceptually lossless representation.

Consider a set of data pairs $(\tilde{N}_i, \tilde{Q}_i)$, $i=1, 2, 3, \ldots, N$, where for the i-th input noise level $\tilde{N}_i$ it has been determined (e.g., via user studies or other techniques) that the corresponding minimal bit depth is $\tilde{Q}_i$. In an embodiment, these pairs can be expressed as a masking-noise to bit depth function $$Q_m = f_N(b_m). \quad (9)$$

For example, without limitation, using simple linear interpolation, for $$\tilde{N}_n \leq b_m \leq \tilde{N}_{n+1}, \quad (10)$$

$$Q_m = \tilde{Q}_n - (\tilde{Q}_n - \tilde{Q}_{n+1})\frac{b_m - \tilde{N}_n}{\tilde{N}_{n+1} - \tilde{N}_n}.$$

In an embodiment, the $Q_m = f_N(b_m)$ mapping may be computed using a look-up table. In an embodiment, it may be more convenient to perform codeword mapping (220) based on the number of required codewords within a histogram bin instead of using the bit depth data directly. This is examined in the next section.

Codeword Mapping Generation

Let $B_T$ denote the target bit-depth for the re-quantized signal (152) (e.g., $B_T=10$ bits/pixel per color component), then the output will be mapped using $2^{B_T}$ codewords. In an embodiment, the range of codewords is normalized to one, hence let $$D_m = \left(\frac{2^{Q_m}}{2^{B_T}}\right) / 2^{B_I}. \quad (11)$$

denote the number of normalized codewords per bin m. For example, if $Q_m=9$, $B_I=16$ and $B_T=10$, then $D_m=2^{-17}$.

Let $$d_i = D_m \text{ for } (m-1)W \leq i < mW, \quad (12)$$

denote the number of normalized codewords per input $i \in (0, 2^{B_I}-1)$, then $d_i$ can be considered a lower bound for the number of required codewords per input codeword. The total number of normalized codewords for all input codewords, D, is bounded by 1, or $$D = \sum_{i=v_L}^{v_H} d_i \leq 1. \quad (13)$$

Figure 6A:
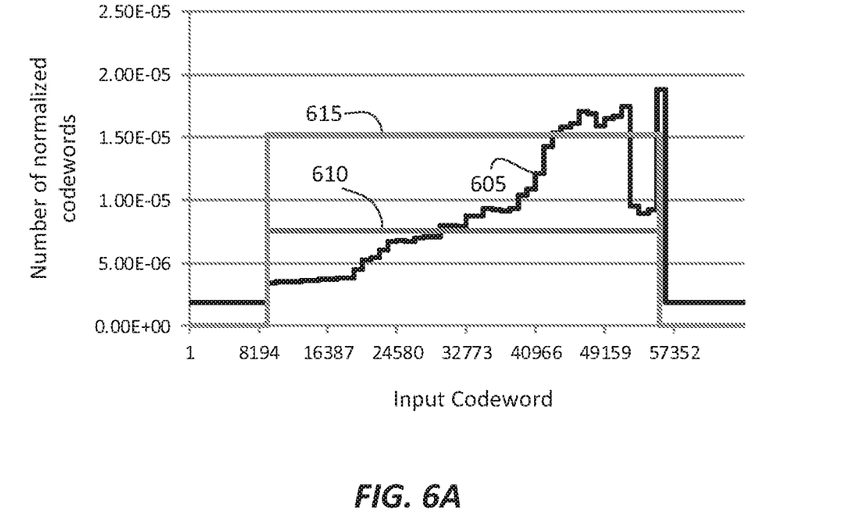
FIG. 6A and FIG. 6B depict examples of computed normalized codeword allocations according to embodiments of this invention.

FIG. 6A depicts an example plot of the number of normalized codewords ($d_i$ (605)) as computed for a single video frame for $B_I=16$ (input codewords range from 0 to 65535). The plot also shows the number of normalized codewords when one simply truncates from 16 bits to either the 9 most significant bits (610) or the 10 most significant bits (615). As depicted in FIG. 6A, a simple 10-bit truncation is not adequate to satisfy the bit-depth requirements for certain input pixels in the highlights range.

Let $U=1-D$ denote the number of unused normalized codewords. These unused codewords need to be reassigned to input codewords according to a given criterion. In an embodiment, without limitation, any one (or a combination thereof) of the following allocation schemes may be employed:

i) Proportional Allocation

Under this criterion, for input $v_L \leq i \leq v_H$ additional codewords are assigned based on the existing distribution, or $$\tilde{d}_i = d_i + U\frac{d_i}{D}, \quad (14)$$

where $\tilde{d}_i$ denotes the updated number of normalized codeword values.

ii) Constant Offset Allocation

Under this criterion, excess codewords are evenly distributed, or for input $v_L \leq i \leq v_H$, $$\tilde{d}_i = d_i + \frac{U}{v_H - v_L}. \tag{15}$$

iii) Histogram-based Allocation

Let $h_i$ denote the histogram of the original input image, that is for $v_L \leq i \leq v_H$, $h_i = k$ denotes that out of P pixels there are k pixels with the value i. Then, under this criterion, the codewords are assigned according to the histogram values, or for input $v_L \leq i \leq v_H$ $$\tilde{d}_i = d_i + U \frac{h_i}{P}. \tag{16a}$$

In a variation, one may divide the input range into M sub-ranges (e.g., for M=3, blacks, mid-tones, and highlights) and compute histogram $H_m$ (m=1, 2, . . . , M) denoting the total number of input pixels within the m-th sub-range, then, for i belonging in the m-th pixel sub-range $$\tilde{d}_i = d_i + U \frac{H_m}{P}. \tag{16b}$$

iv) Scalar-based Allocation

This can be considered a combination of the histogram-based allocation (e.g., consider a histogram with only two bins; one for darks and one for highlights) with the constant offset allocation. Let a denote a parameter between 0 and 1 denoting the relative importance of "darks" versus "highlights," then, for input $v_L \leq i \leq v_H$, under this criterion $$\tilde{d}_i = d_i + a\left(\frac{U}{v_H - v_L}\right) + (1-a)(i - v_L)\left(\frac{U}{v_H - v_L}\right). \tag{17}$$

If U=0, then no redistribution of codewords is possible. Under such a scenario, as will be discussed later on as well, an encoder may decide to either increase the target bit depth, add noise to the input image to effectively reduce the $d_i$ distribution, or do nothing and rely on the decoder and post-processing filtering to reduce the observable quantization noise. The remaining processing steps may operate directly on the $\tilde{d}_i$ data; however, in an embodiment, these data may be smoothed by a low pass filter, e.g., a 2N+1-tap averaging filter, for improved performance.

Let $\tilde{s}_i = 0$, for $i < v_L$ and $i > v_H$, and $$\tilde{s}_i = \frac{1}{2N+1} \sum_{k=-N}^{N} a_k \tilde{d}_{i+k}, \text{ otherwise,} \tag{18}$$

where $a_k$, k=−N, −N+1, . . . , N, denotes the filter coefficients of the smoothing filter $$\left(\text{e.g., } a_k = \frac{1}{2N+1}\right).$$

In an embodiment, the length of this filter is large enough to span at least the size of two consecutive bins of the noise-mask histogram (e.g., N=W). Larger filters will provide better smoothing, but require more computational power.

Figure 6B:
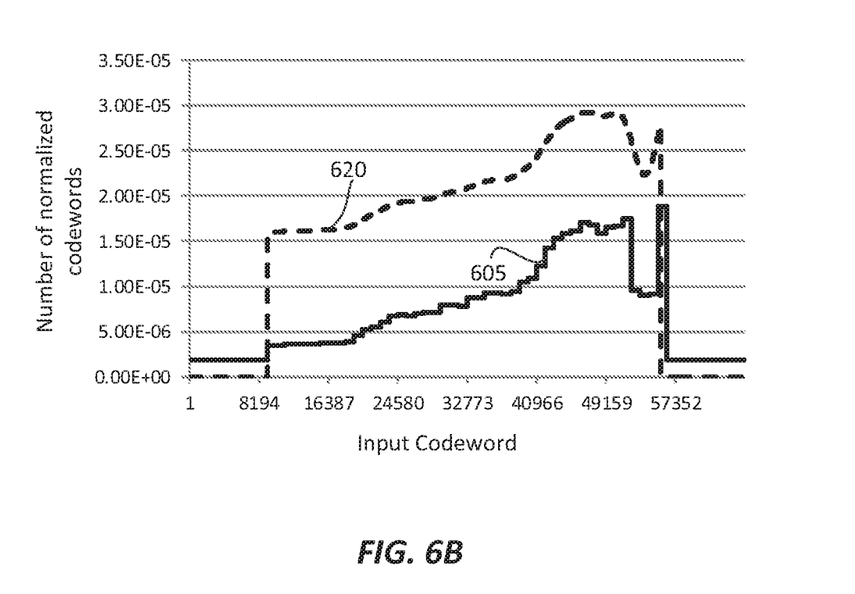

FIG. 6B depicts an example plot of $\tilde{s}_i$ data (620), representing smoothed $\tilde{d}_i$ data computed according to the constant offset allocation scheme. In some cases, the sum of $\tilde{s}_i$ values may exceed 1, hence, these values needs to be re-normalized again, as $$S = \sum_{i=v_L}^{v_H} \tilde{s}_i, \tag{19}$$

$$s_i = \frac{\tilde{s}_i}{S}.$$

Values of $s_i$ should still satisfy the lower bound constraint, namely $$s_i \geq d_i \text{ for } v_L \leq i \leq v_H. \tag{20}$$

Given $$FL(i) = \sum_{k=0}^{i} s_k, \tag{21}$$

then, in the j-th frame, for a given input pixel $I_{jp} = i$ (i∈(0, $2^{B_I}$−1)) the final, normalized, re-quantized pixel value $s_{jp}$ may be expressed as:

$$s_{jp} = \begin{cases} 0, & \text{if } i < v_L \\ 1, & \text{if } i > v_H \\ FL(i), & \text{if } v_L \leq i \leq v_H \end{cases} \tag{22}$$

Figure 6C:
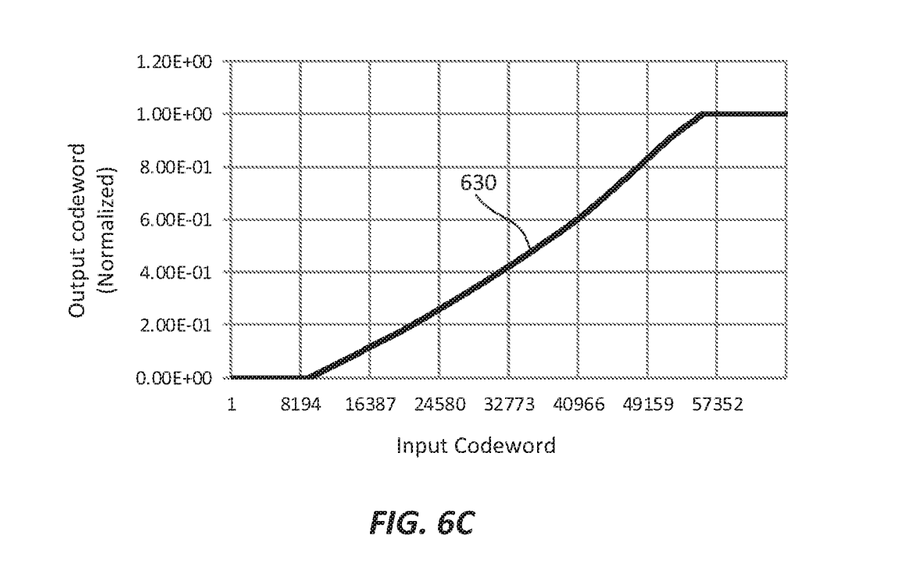
FIG. 6C depicts an example of adaptive perceptual quantization mapping according to an embodiment of this invention.

In an embodiment, FL(i) values may be stored in a pre-computed look-up table (LUT). Alternatively, normalized $s_{jp}$ values may also be mapped to de-normalized values in the range 0 to $2^{B_T}$−1. An example of an FL(i) mapping (630), based on the (620) data is depicted in FIG. 6C.

Figure 7:
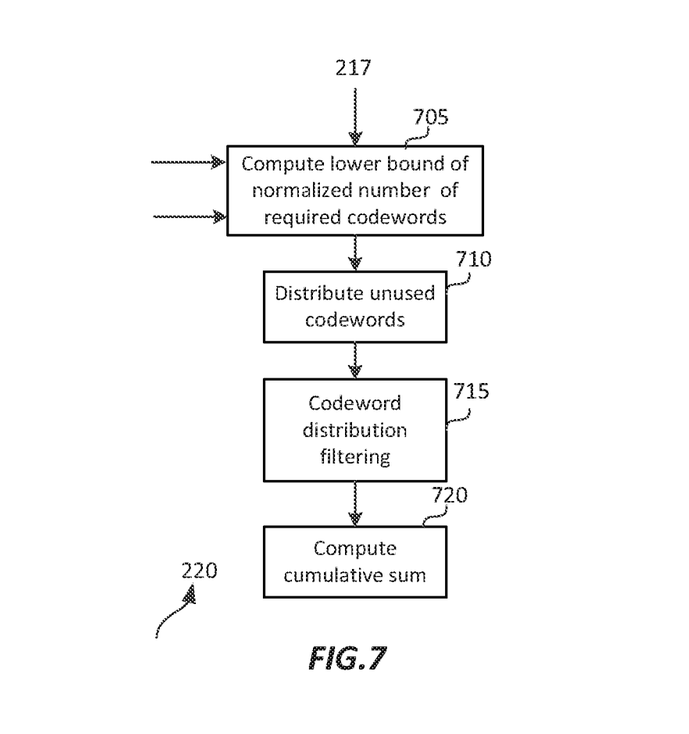
FIG. 7 depicts an example process for codeword mapping according to an embodiment of this invention.

FIG. 7 depicts an example summary of the steps in the codeword-mapping process (220). Given as input the required bit-depth per noise-histogram bin ($Q_m$) (217), the input bit depth ($B_I$) and the target bit depth ($B_T$), step (705) computes a lower bound of the normalized number of required codewords per input $I_{jp} = i$ according to equation (12). In step (710), any unused codewords are re-distributed according to any one of a number of redistribution schemes, for example, as described by equations (14-17). Optionally, in step (715), the redistributed data $\tilde{d}_i$ is filtered (e.g., see equation (18)), to generate a smoothed, normalized number of codewords, which in step (720) is used to generate the final codeword mapping based on a cumulative-sum function.

Frame-based Adaptive Quantization

As discussed earlier, according to equation (7), in an embodiment, adaptive quantization may be based on noise-masking histogram data collected across multiple frames in a scene. Collecting data across multiple frames may introduce significant delay which may be unacceptable in an environment when adaptive quantization needs to be performed in real-time. In another embodiment, codeword mapping (or reshaping) may be performed using data from the first frame in a scene; however, the mapping may be adjusted periodically to accommodate for small variations within the frames of the scene. Such a process is described in pseudo-code in Table 1.

TABLE 1

Frame-based Adaptive Quantization

```
// select thresholds ω, ε, and δ (small numbers, e.g., 0.3).
//
{s_{-1}} = {0};
v_L = K = 2^B;
v_H = -1;
Flag_New_LUT = 1; // Force a new codeword generation
for( j = 0 ; j < F; j ++ ) {   // go through each frame
        calculate noise level {b_{j,m}} for frame j //See equation (6)
        obtain extreme values (v_{L,j}, v_{H,j})
        obtain curve {d_i} for frame j // See equation (12)
    // if the required bit depth in current frame exceeds a margin in
current LUT
    // or the min or max value is outside given tolerance, then
    // we need to create a new codeword LUT
        if((∃d_i > (1-ω)s_i) || (v_{L,j} < (1+ε)v_L) || (v_{H,j} > (1-ε)v_H )){
                Flag_New_LUT = 1
        }
        if(Flag_New_LUT == 1) { // need to create a new LUT
            set the low extreme value with a margin
            v_L=max{0,(1-δ)v_{L,j}}
            set the high extreme value with a margin
            v_H=min{K,(1+δ)v_{H,j}}
            use current curve {d_i} to construct {s_i}
            construct the forward LUT {FL(i)} // see equation (21)
            Flag_New_LUT = 0
        }
}
```

Backward Reshaping

In some embodiments, backward reshaping (160) may be applied to reverse the effects of forward reshaping (150). In an embodiment, a look-up table for inverse quantization may be constructed as follows:

a) For each codeword in the quantized domain ($s_c$), identify all input codewords ($v_i$) for which $FL(v_i)=s_c$. Let this group be denoted as $\omega(s_c)=\{v_i|FL(v_i)=s_c\}$; then b) Construct the backward reshaping function ($BL(s_c)$) as a function of $\omega(s_c)$.

For example, in an embodiment, without limitation, $BL(s_c)$ may be constructed as the average of all codewords that belong to $\omega(s_c)$, or if $|\omega(s_c)|>0$, then $$BL(s_c) = \frac{\sum_{i \in \omega(s_c)} v_i}{|\omega(s_c)|}, \quad (23)$$

where $|\omega(s_c)|$ denotes the number of elements in the set $\omega(s_c)$. If $|\omega(s_c)|=0$ for any $s_c$ values, in an embodiment, these values may be interpolated from its neighbor non-zero values.

Alternative Embodiments

As described earlier, in one embodiment, the proposed adaptive quantization may be performed before a coding (compression) step (120) to accommodate bit-depth-related limitation of existing codecs. After quantization, data related to the reshaping mapping function (630) (e.g., an inverse mapping function) may be embedded as metadata (e.g., as the coefficients of a multi-segment linear or 2nd-order polynomial or as a look-up table) to allow a decoder to perform the inverse mapping. Alternatively, if there is no satisfactory reshaping function that can operate within the target bit-depth limits, in an embodiment, noise or dithering as known in the art may be added to the original smooth areas of the image to improve the masking of the quantization errors. Such noise may be added according to the output of the noise mask histogram generation step (210).

In some embodiments, the content-based perceptual quantization process may be further adapted and adjusted according to information received by a decoder. For example, if a downstream device is attached to a display with sensors for measuring the intensity of ambient light or the viewing distance, such information can be sent upstream to the encoder to adjust either the filters for noise mask generation (205) or other parameters of the adaptive quantization process (e.g., the redistribution step). For example, for high ambient light, fewer quantization steps are needed in the dark areas.

In some embodiments, instead of performing noise injection or dithering at the encoder stage, this operation may be performed in the decoder based on metadata information sent by the encoder (e.g., the noise mask histogram).

As would be appreciated by people having ordinary skills in the art of image processing, the proposed content-adaptive quantization techniques may be applicable to variety of other image processing applications which reduce the bit depth requirements by applying additive noise, dithering, or bit truncation.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to the adaptive perceptual quantization of images with enhanced dynamic range, such as those described herein. The computer and/or IC may compute any of a variety of parameters or values that relate to the adaptive perceptual quantization processes described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to adaptive perceptual quantization of HDR images as described above by executing software instructions in a program memory accessible to the processors. The invention may also be provided in the form of a program product. The program product may comprise any non-transitory medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

EQUIVALENTS, EXTENSIONS, ALTERNATIVES AND MISCELLANEOUS

Example embodiments that relate to the efficient adaptive perceptual quantization of HDR images are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for the perceptual quantization of images with a processor, the method comprising:
   accessing with a processor an input image in an input bit depth;
   applying a noise-mask generation process to the input image to generate a noise mask image, wherein the noise mask image characterizes pixels in the input image in terms of their perceptual relevance to mask quantization noise;
   generating a noise-mask histogram based on the input image and the noise mask image;
   for one or more bins in the noise-mask histogram, applying a masking-noise level to bit-depth function to generate minimal bit depth values for the one or more bins;
   generating a codeword mapping function based on the input bit depth, the minimal bit depth values, and a target bit depth, wherein generating the codeword mapping function comprises:
   generating a lower bound of normalized number of required codewords in the target bit depth based on the minimal bit depth values, the input bit depth and the target bit depth;
   allocating unused normalized codewords to the whole dynamic range of the input image according to an allocation scheme to generate updated normalized numbers of required codewords; and
   generating the codeword mapping function by computing a cumulative sum of the updated normalized numbers of required codewords; and
   applying the codeword mapping function to the input image to generate an output image in the target bit depth, wherein the target bit depth is smaller than the input bit depth.

2. The method of claim 1, wherein the noise-mask generation process comprises:
   applying a first filter to the input image to generate a first filtered image (L);
   generating a second image by computing the absolute value of the difference between the input image and the first filtered image; and
   generating the noise mask image (H) by applying a second filter to the second image.

3. The method of claim 2, wherein the first filter is a low-pass Gaussian filter.

4. The method of claim 2, wherein the second filter is a low-pass Gaussian filter.

5. The method of claim 2, further comprising:
   applying a pixel selection process to the noise mask image to eliminate pixels deemed not essential in the quantization process.

6. The method of claim 1, wherein generating the noise-mask histogram comprises:
   computing a dynamic range of the input image based on the input bit depth;
   dividing the dynamic range into M sub-ranges, wherein M is an integer larger than 1;
   for the i-th sub-range:
     identifying all pixels in the input image which have pixels values within the i-th sub-range;
   for each pixel in the i-th sub-range,
     determining its corresponding noise-mask value in the noise mask image;
     determining the minimum of the noise-mask values for all pixels in the i-th sub range; and
     assigning to the i-th bin in the noise-mask histogram the minimum of the noise-mask values for the pixels in the i-th sub-range.

7. The method of claim 1 wherein the input image is a high dynamic range image encoded according to gamma encoding or SMPTE ST 2084.

8. The method of claim 1, wherein the masking-noise level to bit-depth function is generated according to results from a perceptual user study.

9. The method of claim 1, further comprising, filtering the updated normalized numbers of required codewords by a low-pass filter before generating the codeword mapping function.

10. The method of claim 9, wherein the low-pass filter comprises a (2N+1)-tap averaging filter, wherein N is a positive integer.

11. The method of claim 1, wherein the allocation scheme comprises a proportional allocation scheme, where for the i-th input pixel value $$\tilde{d}_i = d_i + U\frac{d_i}{D},$$

wherein $\tilde{d}_i$ denotes the updated normalized number of codeword values, $d_i$ denotes the normalized number of required codewords, D denotes the sum of $d_i$ values, and U=1−D.

12. The method of claim 1, wherein the allocation scheme comprises a constant offset allocation scheme, where for the i-th input pixel value $$\tilde{d}_i = d_i + \frac{U}{v_H - v_L},$$

wherein $\tilde{d}_i$ denotes the updated normalized number of codeword values, $d_i$ denotes the normalized number of required codewords, if D denotes the sum of $d_i$ values, then U=1−D, $v_H$ denotes a maximum input pixel value, and $v_L$ denotes a minimum input pixel value.

13. The method of claim 1, wherein the allocation scheme comprises a histogram-based allocation scheme, where for the i-th input pixel value $$\tilde{d}_i = d_i + U\frac{h_i}{P},$$

wherein $\tilde{d}_i$ denotes the updated normalized number of codeword values, $d_i$ denotes the normalized number of required codewords, $h_i$ denotes the number of pixels in the input image with a value equal to i, if D denotes the sum of $d_i$ values, then U=1−D, and P denotes the total number of pixels under consideration in the input image.

14. The method of claim 1, wherein the allocation scheme comprises a scalar-based allocation scheme, where for the i-th input pixel value $$\tilde{d}_i = d_i + a\left(\frac{U}{v_H - v_L}\right) + (1-a)(i - v_L)\left(\frac{U}{v_H - v_L}\right),$$

wherein $\tilde{d}_i$ denotes the updated normalized number of codeword values, $d_i$ denotes the normalized number of required codewords, if D denotes the sum of $d_i$ values, then U=1−D, $\alpha$ is a scalar between 0 and 1, $v_H$ denotes a maximum input pixel value, and $v_L$ denotes a minimum input pixel value.

15. The method of claim 1, wherein generating the codeword mapping function for an input pixel value i comprises computing $$FL(i) = \sum_{k=0}^{i} s_k,$$

wherein $s_k$ values are derived based on the updated normalized number of codeword values.

16. The method of claim 15, wherein generating the output image comprises computing:

$$s_p = \begin{cases} 0, & \text{if } i < v_L \\ 1, & \text{if } i > v_H \\ FL(i), & \text{if } v_L \leq i \leq v_H \end{cases},$$

wherein for a pixel $I_p=i$ in the input image, $s_p$ denotes the corresponding, normalized, quantized output pixel, $v_H$ denotes a maximum input pixel value, and $v_L$ denotes a minimum input pixel value.

17. The method of claim 1, wherein the minimal bit depth values are computed based on minimal bit depth values computed across multiple consecutive frames in a video scene that includes the input image.

18. The method of claim 1, further comprising:
upon determining that the target bit depth can't be satisfied with the allocation step, adding noise or dithering to the input image according to the noise mask image and generating a newer lower bound of normalized number of required codewords to replace the lower bound of normalized number of required codewords.

19. A system for adaptive quantization, the system comprising:
a processor to receive input frames and generate re-quantized frames according to the method of claim 1;
a processor for coding the re-quantized frames to generate coded frames;
a processor for decoding the coded frames to generate decoded frames; and
a processor to generate output frames by applying a backward reshaping function to the decoded frames.

20. An apparatus comprising a processor and configured to perform the method recited in claim 1.

21. A non-transitory computer-readable storage medium having stored thereon computer-executable instruction for executing a method with one or more processors in accordance with claim 1.

* * * * *